June 1, 1926. 1,586,621
I. E. GORDON ET AL
VEHICLE SWITCH
Filed March 29, 1924
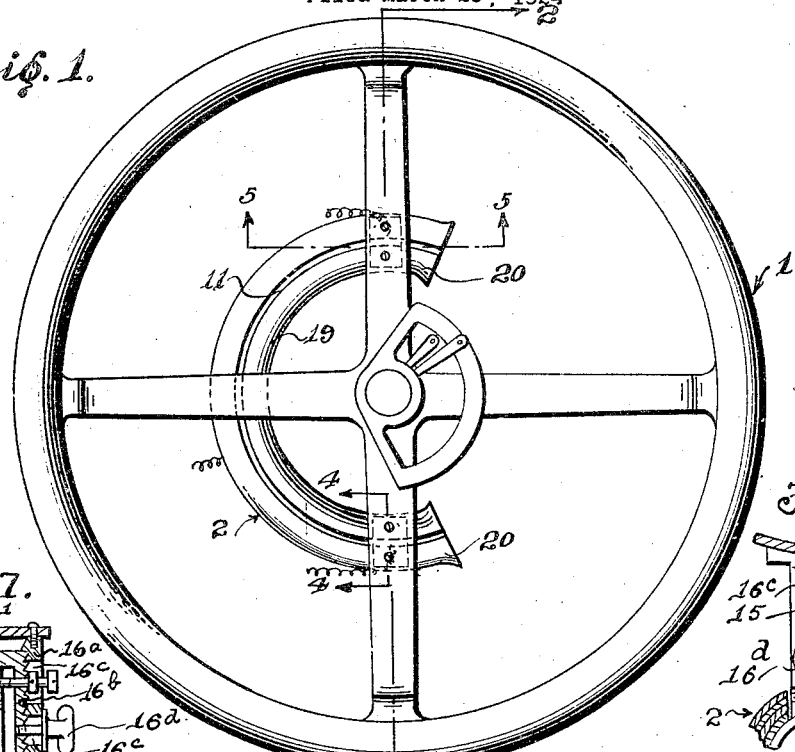
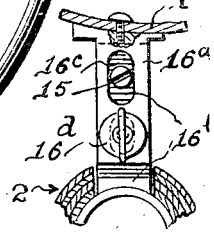
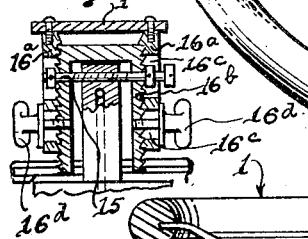
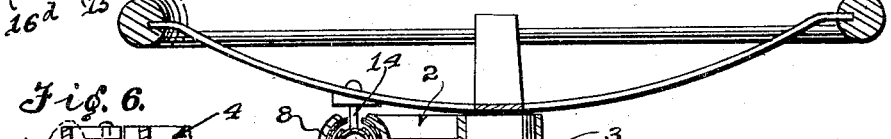
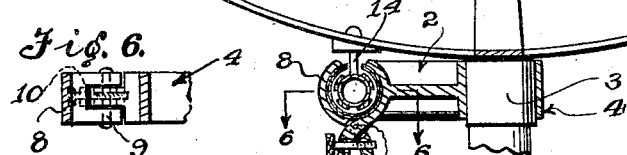
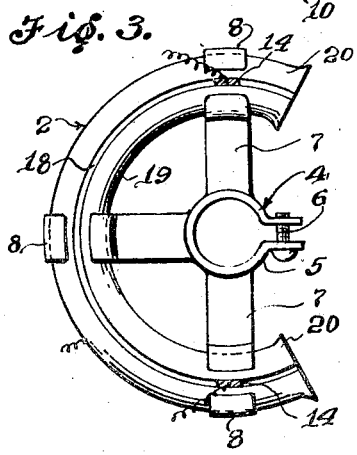
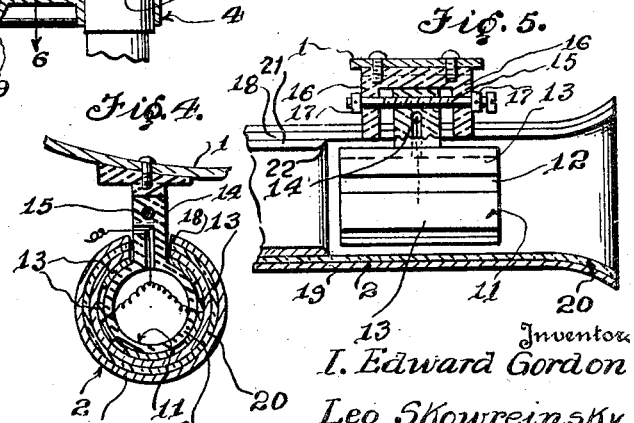
Inventor  
I. Edward Gordon  
Leo Skowreinsky  
By J. Kaplan  
Attorney Patented June 1, 1926.

1,586,621

UNITED STATES PATENT OFFICE.

ISIDORE EDWARD GORDON AND LEO SKOWREINSKY, OF NEW YORK, N. Y.

VEHICLE SWITCH.

Application filed March 29, 1924. Serial No. 702,873.

This invention relates to motor vehicle switch devices and more particularly to that class of signals situated at the rear of a vehicle to indicate the changes in the direction of travel.

The primary object of the invention resides in the provision of a signal apparatus operable by the steering-wheel of a motor vehicle to indicate the direction of travel.

One of the objects of the invention further resides in the construction of a signal apparatus of the type above set forth wherein electric contact is made and broken when the steering wheel is operated to indicate whether the vehicle is to turn to the left or right.

Another object of the invention is the construction of a novel and improved signal apparatus, designed and capable of being installed on practically any type of motor vehicle without rearranging or reorganizing any of the standard parts, and one in which the mechanism is extremely simple, easily assembled and therefore inexpensive to manufacture, highly efficient in operation, practical, and otherwise meeting the requirements necessary for long service without particular care and attention.

With these objects in view and others which will be manifest and suggested as the purpose and nature of our invention are revealed in the following specification and drawings, wherein we have shown but one embodiment thereof, Figure 1 is a top view of a steering wheel for a motor vehicle showing the circuit closer attached thereto.

Figure 2 is a section on line 2—2 of Figure 1.

Figure 3 is a top plan view of the circuit closer detached from the steering wheel.

Figure 4 is a section on line 4—4 of Figure 1.

Figure 5 is a section on line 5—5 of Figure 1.

Figure 6 is a section on line 6—6 of Figure 2.

Figure 7 is a modified form of the support for a slidable contact member shown in Figure 5.

Figure 8 is a side view thereof.

Referring now to the drawings in detail wherein like parts designate corresponding parts throughout the specification, numeral 1 designates a steering wheel of a motor vehicle having a circuit closer 2 clamped to the steering wheel post 3 by clamp 4. This clamp consists of a clamping ring 5, a screw 6, spokes 7, and a clamping element 8, pivoted at 9, and a set screw 10 to tighten the circuit closer securely in place.

Attached to the under side of the spokes of the steering wheel is a slidable contact member 11 consisting of a cylindrical tube 12 of an insulating material, and having conducting strips 13 attached to the outer surface. The upper part of the tube 12 is formed into a neck 14 having a threaded bolt 15 running through same. The ends of the rod revolve in a U-shaped member 16. Attached to the ends of the bolt 15 are collars 17. By turning the bolt 15, the slidable contact member 12 can be adjusted to fit into the slot of the circuit closer 2.

In Figure 7, a modified form of the U-shaped member supporting the slidable contact member 11 is shown. Provision is made to lower and raise the slidable member 11 so it can readily fit into the crescent tube 19. Numeral 16$^a$ designates two members having teeth on the inside to support a U-shaped member 16$^b$. Numeral 16$^c$ designates slots, and 16$^d$ thumb screws to lock the elements 16$^a$ and 16$^b$ together.

The circuit closer consists of a crescent tube 19 flared at the ends as at 20, and having a slot 18 for the neck 14 of the slidable contact member 11 to slide into.

Within the inside of the tube 19 is an insulated lining 20 extending to the ends of the tube, and a shorter conducting lining 21 ending at 22. (See Figure 7.)

The operation of this device is as follows. When the steering wheel is in a straight ahead position, there is no contact between the contact members 11 and conducting lining 21. When the steering wheel is turned to the right, the lower contact member 11 will contact with the conducting lining 21 and make an electric circuit which will illuminate the upper compartment 24 and at the same time, the bulb 27 in the center compartment will light up. When the steering wheel is turned to the left, the upper contact member 11 contacts with the conducting lining 21 and makes another contact.

In the accompanying drawings, we have shown our invention as embodied and illustrated in one way, by the way of example. It will be understood, however, that other embodiments may be resorted to and therefor we do not wish to be limited or restricted to the precise and exact details of construction shown, except as specified in the subject matter being claimed.

Having shown and described our invention, what we now claim as new and desire to secure by Letters Patent of the United States is:

1. In a circuit closer of the class described in combination, a crescent-shaped tube, flared at the ends, a slot at the top of the said tube, an insulated lining within the tube, a conducting lining within the insulated lining, the said conducting lining being shorter than the said insulated lining, a clamp consisting of spokes and a clamping ring for attaching the said circuit closer to a steering rod of a motor vehicle, a contact member slidable in said circuit closer, a neck at the upper part of said slidable element, the said neck being movable in a U-shaped member, and a threaded bolt, to adjust the lateral movement of the movable element.

2. In a device of the class described in combination, a steering wheel, two U-shaped members attached to the under side of the steering wheel, a threaded bolt running through the said U-shaped members, a slidable contact member adapted to move radially when the said bolt is turned, conductive strips on the outer surface of the said slidable contact member, a crescent-shaped tube having flares at the ends and a slot at the top, a clamp to attach the said tube to a steering wheel post of a motor vehicle, a clamping element, a set screw to adjust the said clamping element, an insulated lining within the crescent-shaped tube, a conducting lining within the said insulated lining, the said conducting lining being shorter than the said insulating lining, all arranged to make an electrical contact when either of the slidable members move.

3. In a device of the class described in combination, a steering wheel, two sets of members attached to the under side of the said steering wheel, teeth on the inside of the said members, slots in the said members, a U-shaped member within the first mentioned members, a threaded rod running through the said U-shaped member, thumb screws screwed into the said U-shaped member, a slidable contact member adapted to move when the said rod is turned, conductor strips on the outer surface of the said slidable contact member, a crescent-shaped tube having flares at the ends and a slot at the top, a clamp to attach the said tube to a steering wheel post of a motor vehicle, a clamping element, a set screw to adjust the said clamping element, an insulated lining within the crescent-shaped tube, a conducting lining being shorter than the said insulating lining, all arranged to make an electrical contact when either of the slidable members move.

In testimony whereof we affix our signatures.

I. EDWARD GORDON.
LEO SKOWREINSKY.